United States Patent
Drexler et al.

(10) Patent No.: US 7,395,362 B2
(45) Date of Patent: Jul. 1, 2008

(54) METHOD FOR A SLAVE DEVICE TO CONVEY AN INTERRUPT AND INTERRUPT SOURCE INFORMATION TO A MASTER DEVICE

(75) Inventors: Barry L. Drexler, Oakdale, NY (US); Steven J. Sipek, Holbrook, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 86 days.

(21) Appl. No.: 11/346,729

(22) Filed: Feb. 3, 2006

(65) Prior Publication Data

US 2007/0186021 A1    Aug. 9, 2007

(51) Int. Cl.
*G06F 13/24* (2006.01)
*G06F 13/00* (2006.01)

(52) U.S. Cl. .................... 710/260; 710/110; 710/269

(58) Field of Classification Search ........ 710/260–269, 710/48–52, 110
See application file for complete search history.

(56) References Cited

U.S. PATENT DOCUMENTS

| | | | |
|---|---|---|---|
| 3,999,165 A | 12/1976 | Kita et al. | |
| 5,237,322 A | 8/1993 | Heberle | |
| 5,237,628 A | 8/1993 | Levitan | |
| 5,463,752 A * | 10/1995 | Benhase et al. | ............. 711/154 |
| 5,495,240 A | 2/1996 | Heberle | |
| 5,671,421 A | 9/1997 | Kardach et al. | |
| 5,687,381 A * | 11/1997 | Swanstrom et al. | ......... 710/269 |
| 5,848,278 A | 12/1998 | Sakai | |
| 5,892,956 A | 4/1999 | Qureshi et al. | |
| 5,905,898 A | 5/1999 | Qureshi et al. | |
| 6,055,372 A | 4/2000 | Kardach et al. | |
| 6,418,497 B1 * | 7/2002 | Guthrie et al. | .............. 710/264 |
| 6,816,935 B1 * | 11/2004 | Gulick | ....................... 710/260 |
| 6,877,057 B2 | 4/2005 | Alexander et al. | |

\* cited by examiner

*Primary Examiner*—Raymond N Phan
(74) *Attorney, Agent, or Firm*—Meyertons Hood Kivlin Kowert & Goetzel, P.C.; Jeffrey C. Hood

(57) ABSTRACT

A computer system, more generally a master-slave system, may be configured with interrupt handling capability without additional dedicated interrupt lines. An interrupt condition may be bound with its relevant cause information and transmitted by a slave device during a typical response to any operation that a master device may have issued, such as a read or a write. In addition, a link level protocol may be configured in the bus interface of the master device to continually poll specified addresses, or to issue a unique command targeted at interrupts. The master device may be unaware of the unique requests, as the bus may remain idle as seen by the master device. The response to the unique requests may be similar to the interrupt message information transmitted as part of a response to a standard request that may be made by the master device. A master device may thus also receive interrupts without having to configure a slave device with the ability to make requests, or without the master device having to poll for interrupts.

22 Claims, 4 Drawing Sheets

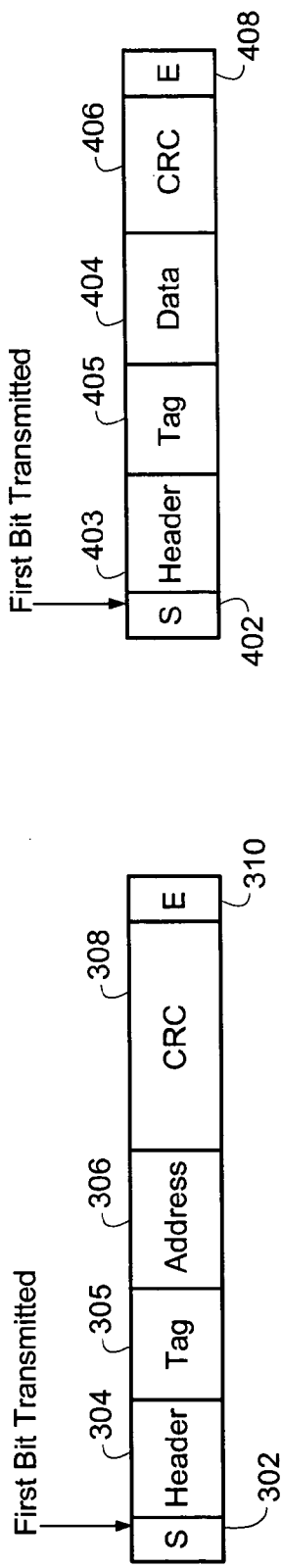
FIG. 4
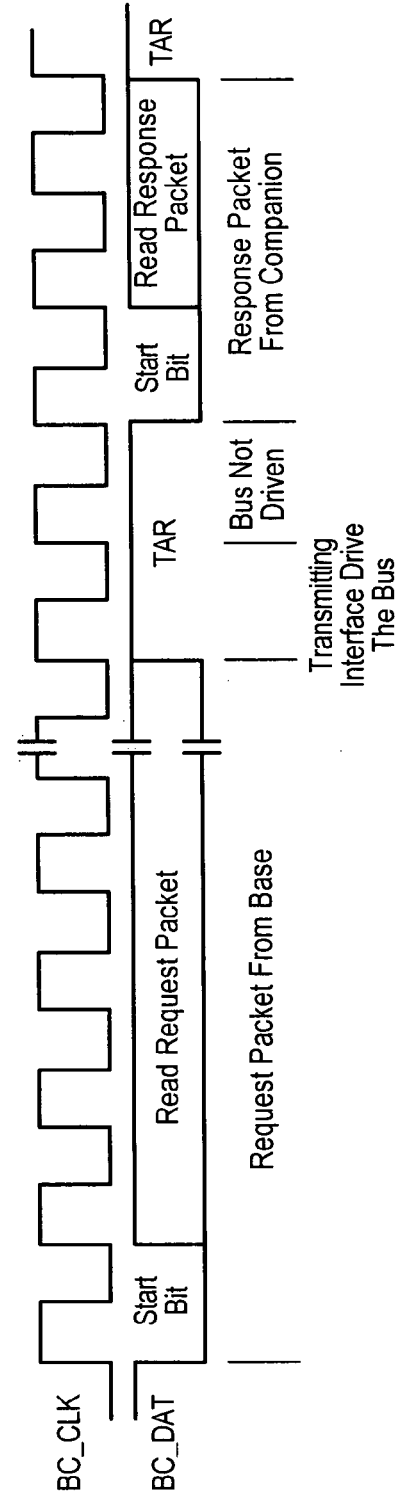
FIG. 5
FIG. 3

METHOD FOR A SLAVE DEVICE TO CONVEY AN INTERRUPT AND INTERRUPT SOURCE INFORMATION TO A MASTER DEVICE

BACKGROUND OF THE INVENTION

1. Field of the Invention

This invention relates to digital interface design, and more particularly, to bus interface design.

1. Description of the Related Art

Interrupts provide principal functionality in many computer systems. Generally, interrupts comprise asynchronous hardware signals and/or software flags indicating when respective subsystems or routines require attention. A hardware interrupt to a processor or a master controller typically causes the processor or controller to save its current execution state, and begin executing an interrupt handler. A software interrupt typically comprises instructions in an instruction set, configured to enable a context switch to the interrupt handler in a manner similar to that of a hardware interrupt. In general, interrupts provide a means to eliminate the need for a processor to use polling loops for checking/waiting for external events, by signaling the processor that an event has occurred, all the while the processor carries on executing other tasks while that event is pending.

Interrupts may be implemented in hardware with control lines, otherwise known as interrupt lines, or they may be integrated into memory subsystems, and fall into a variety of categories. Examples of interrupts include software interrupt, interprocessor interrupt, maskable interrupt, non-maskable interrupt, and spurious interrupt. Many processors will typically have an internal interrupt mask that, when set, allows software to ignore all external hardware interrupts, which provides faster access than disabling interrupts in the device itself. Sometimes, disabling and enabling interrupts on the processor itself may actually be slower. Interrupts are typically used for system timers, disk Input/Output (I/O), traps, and power-off signals, or to transfer data using various transfer protocols (e.g. Ethernet), and are often also used in type-ahead features for buffering events like keystrokes.

One key issue associated with interrupts is interrupt latency, which indicates the time period from the generation of an interrupt to the servicing of that interrupt. In many operating systems interrupts are serviced as soon as the interrupting device's interrupt handler is executed. Interrupt latency may be affected by a variety of factors, including interrupt controllers, interrupt masking, and the methods by which the operating system responds to and processes the interrupt. There is typically a tradeoff between interrupt latency, throughput, and processor utilization. Many times, design techniques that emphasize improving interrupt latency might decrease throughput and increase processor utilization. Conversely, increasing throughput may increase interrupt latency and processor utilization, while, reducing processor utilization may increase interrupt latency and decrease throughput.

For example, when a computer communicates with a secondary system, such as an Input/Output device, the computer may initiate requests—e.g. reads and writes—as a bus master. In such a system the secondary device may be configured to simply respond to these requests by returning requested data to the computer for a read, or by acknowledging a write operation. If, the secondary system needs to be serviced by the computer, or needs to notify the computer of an event that the secondary system requires the computer to service, the notification will typically occur via the interrupt line, which would be considered an out-of-band signal line. In other words, in such a system, the interrupt line would comprise an additional signal line that is not the signal line, or part of the signal lines, that convey the computer's requests and the secondary device's responses.

FIG. 1 shows a typical master-slave system, in which the master device 102 controls the clock source and provides clock signal 106. The slave device 104 in this configuration does not initiate any transactions. Data for regular transactions is transmitted via bidirectional bus 108. Control interrupts are signaled by the slave device 104 asserting the interrupt signal 110. The master device 102 may read the various status registers to determine the interrupting source. Interrupts may occur during data transactions, and can typically be serviced after a current transaction completes. As part of a response to such interrupts, the master device 102 (e.g. computer or controller) would typically have to make specific read requests to the slave device 104 over bus 108 after it [master device 102] has received the interrupt, in order to gather information about the interrupting event.

Oftentimes, systems may need to limit interconnect wires due to device size or number of I/O pins available on the device. Configuring such systems with requisite interrupt lines may be costly, or even non feasible, despite a need for the system to have interrupt handling capabilities. The removal of an interrupt line in a 2-wire bus interconnection scheme—for example, the removal of line 110 in the system of FIG. 1—may represent potential cost savings by eliminating a pin from both the computer and the secondary device(s).

Many other problems and disadvantages of the prior art will become apparent to one skilled in the art after comparing such prior art with the present invention as described herein.

SUMMARY OF THE INVENTION

In one set of embodiments, a computer system, more generally a master-slave system, may be configured with interrupt handling capability without additional dedicated interrupt lines. An interrupt condition may be bound with its relevant cause information and transmitted by a slave device during a typical response to any operation—such as a read or a write—a master device may have issued. The interrupt may thus be "piggybacked" onto a response to a standard bus operation request. A slave device may be configured to return data indicating an interrupt as part of a normal response to a master device's request. For cases when the master device may not initiate any requests, a protocol, which may be a link level protocol, in the bus interface of the master device may be configured to continually poll slave devices by issuing a unique command, for example an exception inquiry command, inquiring about interrupts. The master device may be unaware of the unique requests (they may remain hidden), as the master device may be idle with respect to the bus. Slave devices may respond to the unique requests in a manner similar to the response they may transmit in response to a standard bus operation request made by the master device. However, in such instances the response may take place while the master device is idle with respect to the bus. A master device may thus receive interrupts when the bus is busy or idle with respect to the master device, without requiring any additional dedicated interrupt lines, without having to configure a slave device with the ability to make requests, and without the master device (for example an embedded processor) itself having to poll for interrupts.

Other aspects of the present invention will become apparent with reference to the drawings and detailed description of the drawings that follow.

BRIEF DESCRIPTION OF THE DRAWINGS

The foregoing, as well as other objects, features, and advantages of this invention may be more completely understood by reference to the following detailed description when read together with the accompanying drawings in which:

FIG. 3 shows one embodiment of a read request packet;

FIG. 4 shows one embodiment of a read response packet;

FIG. 5 shows timing for a read operation according to one embodiment;

Figure 1:
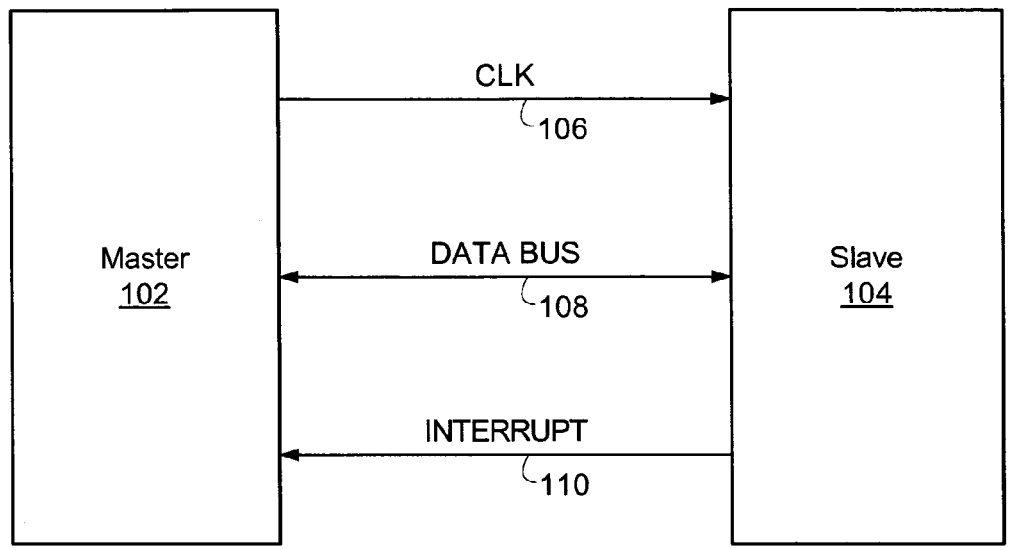
FIG. 1 shows a master-slave configuration in a system according to prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense. (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

As used herein, a "trigger" signal is defined as a signal that is used to initiate, or "trigger", an event or a sequence of events in a digital system. A trigger signal is said to be in a "triggering state" at a time when it initiates a desired event, or sequence of events. A periodic trigger signal may commonly be referred to as a "clock". In a "synchronous" digital system, generally a clock, commonly referred to as a "system clock", may be used for initiating most events, or sequences of events. An example of a triggering state may be, but is not limited to, a rising edge of a pulse of a clock in a synchronous digital system. "Asserting" a signal refers to setting a level of the signal to a high logic level, whereas "deasserting" a signal refers to setting an output of the signal to a low logic level. It will be evident to those skilled in the art that a high logic level may be physically represented by either a high voltage or a low voltage, and similarly a low logic evel may be physically represented by either a low voltage or a high voltage. In addition, "master device" may refer to a computer or controlling device, while "slave device" may refer to a secondary device, for example an Input/Output device.

Figure 2:
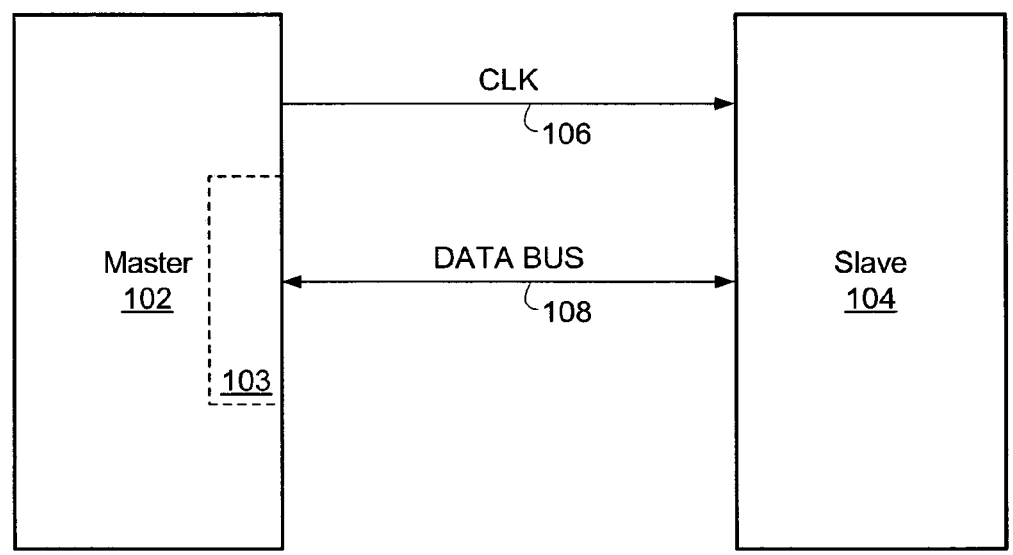
FIG. 2 shows one embodiment of a master-slave configuration without a separate interrupt line.

FIG. 2 shows one embodiment of a simple 2-wire interconnect bus (clock signal 106 and bidirectional data bus 108) coupling master device 102 to slave device 104, similar to the system shown in FIG. 1. However, in the embodiment of FIG. 2, interrupt line 110 of FIG. 1 has been removed. The embodiment of FIG. 2 may be exemplary of a computer system, a computer subsystem interconnect, a control system, or a control subsystem interconnection. It may represent a system/device in which the number of interconnect wires may be limited due to device size or the number of Input/Output pins available on the system/device. Alternate embodiments may not include clock line 106 and may instead be configured with a clock recovery circuit, well known to those skilled in the art. Master device 102 may be a computer that is communicating with slave device 104, which may be a secondary system such as an Input/Output device. The computer as bus master 102 may initiate requests such as reads and writes. In the system shown in FIG. 2, slave device 104 may respond to those requests by returning data requested by the computer on a read or by acknowledging a write operation. In responding to those requests, slave device 104 may request data corresponding to an interrupt condition over the bus without a dedicated interrupt line (such as line 110 in FIG. 1).

In one set of embodiments, data bus 108 may be a single-wire bus, and bus transactions may be packetized. Preferred embodiments of possible packet structures are discussed below. Packets may be structured according to a variety of different bus protocols. For the purposes of simplicity and consistency, all packets shown below have been structured according to one exemplary bus protocol. Those skilled in the art will. appreciate that embodiments other than those discussed below are possible, and may be adapted to a variety of other specified bus protocols not discussed here, according to the principles described herein. FIG. 3 shows one embodiment of a read request packet that may be transmitted by master device 102. The packet may have a start bit 302 and an end bit 310, indicating the beginning and the end of the packet. Header field 304 may be configured to hold information indicating the type of bus operation, which in this case is a read operation in which master device 102 may be requesting slave devices—operating as slave device 104 to respond with data from supplied address 306.

Header field 304 may also be configured to indicate if any special data is included in the packet in addition to any data that may be part of the indicated bus operation. In the example shown, header field 304 would indicate no additional data, as only data associated with a read request is included in the packet. It should be noted that the length of the header field, and any of the other fields, may be specified according to a minimum number of required bits to code for any desired number of possible operations on the bus, and for any number of categories of additional information that may be included in each packet. A tag field 305 may provide identification for the request, enabling master device 102 to send out successive read requests without having to wait for a respective response to each read request prior to transmitting a subsequent read request. The packet may also include a cyclic redundancy check (CRC) code field 308 for error checking. One example of a response packet that may be transmitted by slave device 104 in response to the read request is shown in FIG. 4. The start of the response packet may be indicated by start bit 402, followed by header 403 indicating that no special data is included in the packet, and tag 405 matching the packet to its corresponding request. The requested data 404 (of the read) may be followed by CRC code 406 and end of packet bit 408. In one embodiment, the packet and data transfers occur on the rising edge of clock signal 106. One example of the timing for a read request packet and corresponding read response packet (as shown in FIGS. 3 and 4, respectively) is shown in FIG. 5.

Figure 7:
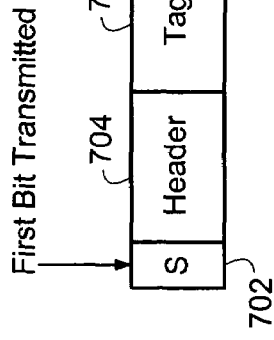
FIG. 7 shows one embodiment of a write response packet.
Figure 6:
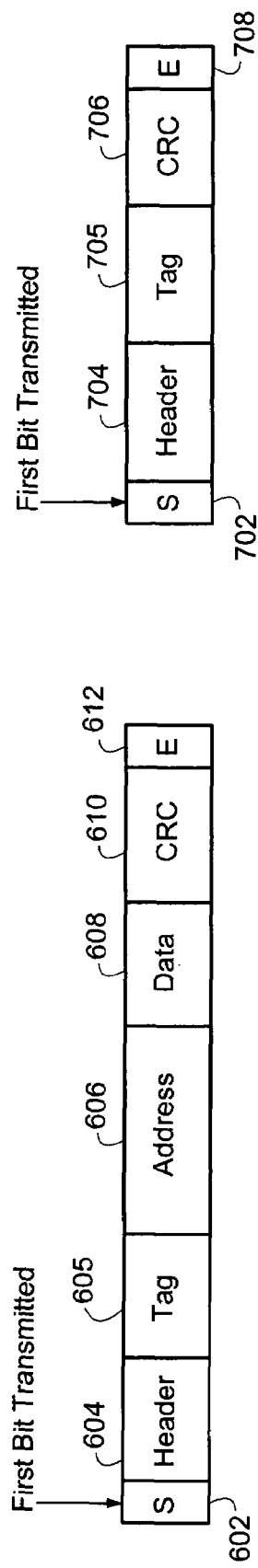
FIG. 6 shows one embodiment of a write request packet.
Figure 8:
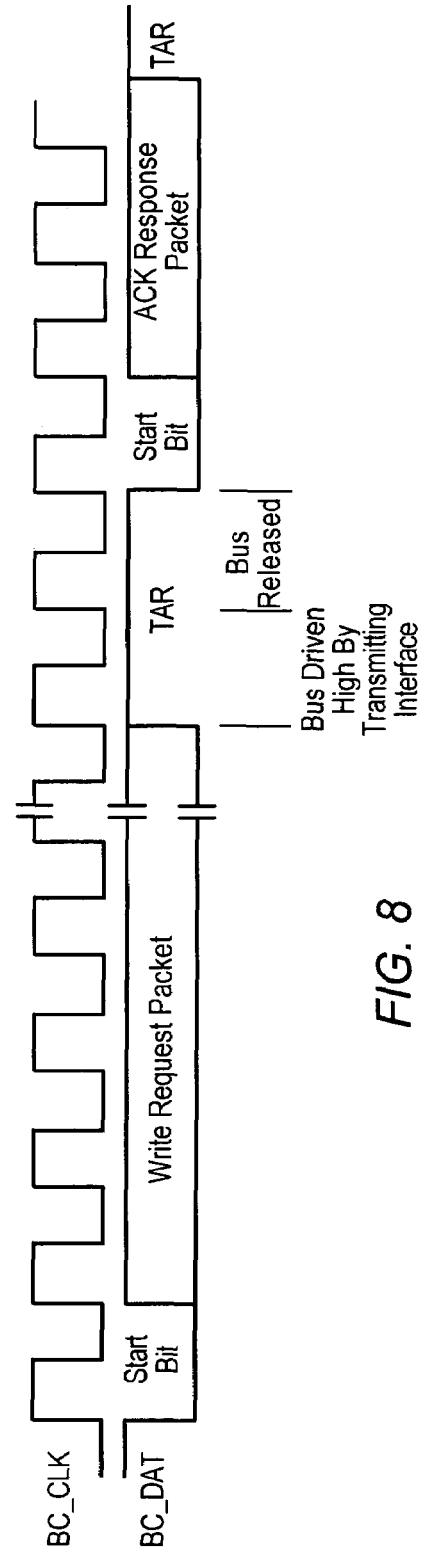
FIG. 8 shows timing for a write operation according to one embodiment.

Similarly, FIG. 6 shows one embodiment of a write request packet that may be transmitted by master device 102. For a write request, start bit 602 may be followed by header 604 indicating a write operation and that no special data is included in the packet. Tag 605 may provide identification for the request. Master device 102 may expect slave device 104 to respond with an acknowledgement for data 608 having been written to supplied address 606. The packet may also include a CRC code 610, with end bit 612 indicating the end of the packet. One example of a response packet that may be transmitted by slave device 104 in response to the write request is shown in FIG. 7. Start bit 702 may be followed by header information 704 indicating acknowledgement of the write operation, and that no special data is included in the packet, followed by tag 705 matching the packet to its corresponding request. For error checking, CRC code 706 may again precede end of packet bit 708. Again, the packet and data transfers may occur on the rising edge of clock signal 106. One example of the timing for a write request packet and corresponding write response packet (as shown in FIGS. 6 and 7, respectively) is shown in FIG. 8.

Figure 9:
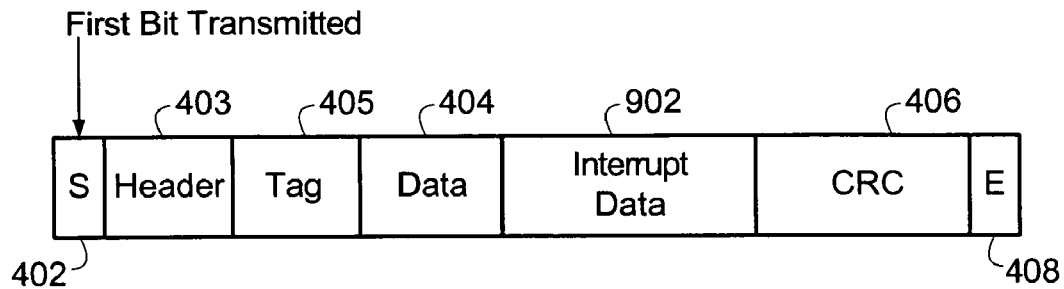
FIG. 9 shows one embodiment of a read response packet that includes interrupt data.
Figure 10:
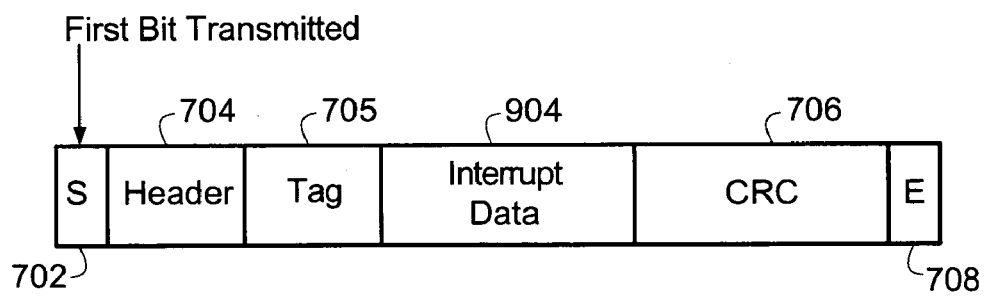
FIG. 10 shows one embodiment of a write response packet that includes interrupt data.

In one set of embodiments, slave device 104 may be configured to communicate relevant cause information of an interrupt condition to master device 102 when transmitting the response packets. Thus, the read response packet shown in FIG. 4 may be reconfigured as shown in FIG. 9. In the embodiment shown in FIG. 9, header information 403 indicates that special data, in this case interrupt data 902, is included in the packet, inserted between read data 404 and CRC code 406. Similarly, slave device 104 may also be configured to communicate relevant cause information of an interrupt condition to master device 102 when transmitting a write response packet. The write response packet shown in FIG. 7 may be reconfigured as shown in FIG. 10. In the embodiment shown in FIG. 10, in addition to indicating acknowledgment of the write operation (identified by tag 705) header information 704 may also indicate that special data, in this case interrupt data 904, is included in the packet, inserted between header information 704 and CRC code 706. Referring again to FIG. 2, when an interrupt occurs, the identifying source may be made available to master device 102 by slave device 104 transmitting interrupt source identifying information 902 (or 904), whereas without this information—when receiving an interrupt over interrupt line 110 in FIG. 1, for example—master device 102 may be required to read and examine a number of registers over bus 108 to obtain the source identifying information.

Figure 11:
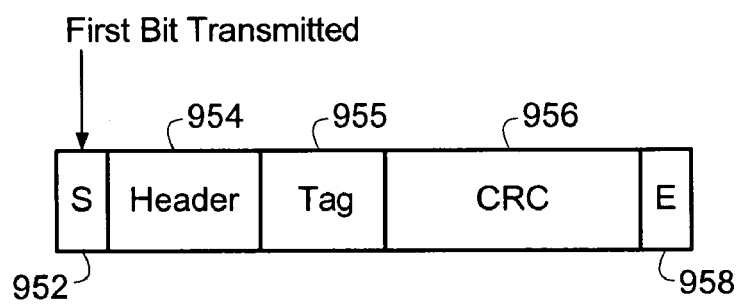
FIG. 11 shows one embodiment of an exception inquiry packet issued as part of a protocol configured in the bus interface of a master device.

As previously described, slave device 104 may be configured with the ability to return an interrupt embedded in a standard response to a request transmitted by master device 102. There may be periods however, when master device 102 does not issue any requests. In order to service interrupts even during such periods, in one set of embodiments, a bus interface 103 configured in master device 102 may be operable to read/poll slave device 102 (and/or other slave devices if more than one slave device is coupled to master device 102 via data bus 108) according to a specified protocol, which may be a link level protocol, or issue an exception inquiry command. In other words, the protocol may be configured to have bus interface 103 periodically poll slave device 104 (or other coupled slave devices) to determine if there are any pending interrupts when there is no other bus activity on bus 108. Master device 102 may be unaware of these exception inquiry commands (they may be hidden) as master device 102 may be idle with respect to bus 108. FIG. 11 shows one embodiment of an ownership request inquiry packet that may be transmitted by bus interface 103 according to the specified protocol. Start bit 952 may indicate the start of the packet, and may be followed by header information 954 indicating that the packet corresponds to an interrupt status request. Tag 955 may identify the request, and may be followed by CRC code 956 before end bit 958. The rate at which exception inquiry commands are issued when there is no other bus activity on data bus 108 may be programmable. In one set of embodiments, the rate may be slowest rate allowed by the system's interrupt latency.

Therefore, a master device may receive interrupts when the bus is busy or idle from the standpoint of the master device, without any additional interrupt lines, without a slave device having to be configured to make interrupt requests, or without the master device—which may be an embedded processor—having to poll for interrupts. It should also be noted, as also previously implied, that alternate embodiments to those shown may include more than one slave device coupled to data bus 108, and in some embodiments bus 108 may not be a single-wire bus.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

We claim:

1. A method for conveying an interrupt in a system, the method comprising:
   (a) a master device transmitting a request for a bus operation;
   (b) a slave device receiving the request for the bus operation;
   (c) the slave device transmitting a bus operation response to the master device in response to said receiving the request for the bus operation, wherein the bus operation response comprises relevant cause information of a first interrupt condition;
   (d) the master device receiving the bus operation response that comprises the relevant cause information of the first interrupt condition; and
   (e) the master device responding to the first interrupt condition in response to having received the relevant cause information of the first interrupt condition.

2. The method of claim 1, further comprising a bus interface issuing a request for interrupt status, wherein the bus interface is coupled to the master device or comprised in the master device.

3. The method of claim 1, wherein said transmitting the request for the bus operation comprises transmitting a request data packet.

4. The method of claim 1, wherein said responding to the first interrupt condition comprises the master device performing one or more operations according to the first interrupt condition.

5. The method of claim 1, wherein (a)-(e) is performed a plurality of times.

6. The method of claim 2, further comprising the master device timing out if no interrupt status is pending.

7. The method of claim 2, further comprising:
   the slave device receiving the request for interrupt status; and
   the slave device transmitting an interrupt status response in response to said receiving the request for interrupt status, wherein the interrupt status response comprises source information of a second interrupt condition.

8. The method of claim 3, wherein the request data packet is one of:
   a read request; and
   a write request.

9. The method of claim 3, wherein said transmitting the bus operation response comprises transmitting a response data packet corresponding to the request data packet, wherein the relevant cause information of the first interrupt condition is comprised in the response data packet.

10. The method of claim 7, wherein said issuing a request for interrupt status comprises transmitting a request packet, wherein the request packet comprises interrupt poll data indicating that the request packet is the request for interrupt status.

11. The method of claim 10, wherein said transmitting the interrupt status response comprises transmitting an interrupt status packet, wherein the source information of the second interrupt condition is comprised in the interrupt status packet.

12. A system comprising:
   a bidirectional data bus;
   a master device operable to issue bus operation requests over the bidirectional data bus; and
   a slave device operable to receive the bus operation requests over the bidirectional data bus, wherein the slave device is operable to issue a respective bus operation response in response to each received bus operation request, wherein in issuing the respective bus operation response the slave device is operable to include relevant cause information of an interrupt condition in the bus operation response;
   wherein the master device is operable to receive the respective bus operation response that includes the relevant cause information of the interrupt condition, and is further operable to respond to the interrupt condition in response to receiving the relevant cause information of the interrupt condition.

13. The system of claim 12 further comprising a clock line coupled between the master device and the slave device, wherein the master device is operable to generate a clock signal and to transmit the clock signal over the clock line.

14. The system of claim 12, wherein the bidirectional data bus comprises a single-wire bus.

15. The system of claim 12, further comprising a bus interface coupled between the master device and the bidirectional data bus, wherein the bus interface comprises a link level protocol operable to issue one or more exception inquiry commands to enable the slave device to process pending interrupts.

16. The system of claim 12, wherein each of the bus operation requests comprises a request data packet, wherein the respective bus operation response comprises a response data packet, wherein the relevant cause information of the interrupt condition is comprised in the response data packet.

17. The system of claim 12, wherein each of the bus operation requests comprises one of:
   a read request; and
   a write request.

18. The system of claim 12, wherein the master device is operable to poll the slave device for interrupt status.

19. The system of claim 12, further comprising a plurality of slave devices coupled to the bidirectional data bus, wherein each of the plurality of slave devices is operable to receive the bus operation requests over the bidirectional data bus, wherein each of the plurality of slave devices is operable to issue a respective bus operation response in response to each received bus operation request, wherein in issuing the respective bus operation response the slave device is operable to include relevant cause information of an interrupt condition in the bus operation response.

20. The system of claim 15, wherein the system is operable to programmatically specify a rate at which the one or more exception inquiry commands are issued when there is no activity on the bidirectional data bus.

21. The system of claim 20, wherein the rate at which the one or more exception inquiry commands are issued when there is no activity on the bidirectional data bus comprises a slowest rate allowed by the system's interrupt latency.

22. A computer system comprising:
   a bidirectional data bus;
   a processing unit operable to issue read request packets and/or write request packets over the bidirectional data bus; and
   an Input/Output device operable to receive the read request packets and/or write request packets over the bidirectional data bus, wherein the Input/Output device is operable to:
      issue a respective read response packet in response to each received read request packet; and
      issue a respective write response packet in response to each received write request packet;
   wherein the respective read response packet and the respective write response packet comprise respective interrupt source identifying information for corresponding pending interrupts; and
   wherein the processing unit is operable to receive the respective read response packet and the respective write response packet that comprise respective interrupt source identifying information for corresponding pending interrupts, and is further operable to respond to the pending interrupts in response to having received the respective interrupt source identifying information.

* * * * *